United States Patent
Tsai

(10) Patent No.: US 6,655,984 B1
(45) Date of Patent: Dec. 2, 2003

(54) COMPACT ELECTRICAL CHARGER

(76) Inventor: Erh-Chien Tsai, No. 199-1, Liu-Tze-Lin, Liu-Hsiang Tsun, Shui-Shang Hsiang, Chia-Yi Hsien (TW)

( * ) Notice: Subject to any disclaimer, the term of this patent is extended or adjusted under 35 U.S.C. 154(b) by 14 days.

(21) Appl. No.: 10/141,747

(22) Filed: May 9, 2002

(51) Int. Cl.[7] .............................................. H01R 13/72
(52) U.S. Cl. ..................................................... 439/501
(58) Field of Search ................................ 439/501–506

(56) References Cited

U.S. PATENT DOCUMENTS

| | | | | |
|---|---|---|---|---|
| 6,480,611 B2 | * | 11/2002 | Hashimoto et al. | 381/371 |
| 2003/0008550 A1 | * | 1/2003 | Tse et al. | 439/501 |
| 2003/0045163 A1 | * | 3/2003 | Lee et al. | 439/501 |

* cited by examiner

*Primary Examiner*—Michael C. Zarroli
(74) *Attorney, Agent, or Firm*—Brinks Hofer Gilson & Lione

(57) ABSTRACT

An electrical charger includes a casing defining a receiving space. A current converting unit includes a circuit board disposed in the receiving space, and formed with two electrical contacts. First and second conductive connecting members are secured in the receiving space, and have board-connecting ends in sliding contact with the electrical contacts. A power plug unit includes two conductive pivot members rotatably and respectively mounted on bifurcated ends of the first and second conductive connecting members. Each pivot member has a grooved cylindrical portion rotatably and detachably retained in a retaining groove of the respective bifurcated end so as to permit rotation of the pivot member in the casing, and a bifurcated portion projecting from the cylindrical portion and defining a gap. Two plug blades extend into the gaps, and are pivoted to the bifurcated portions of the pivot members.

3 Claims, 7 Drawing Sheets

COMPACT ELECTRICAL CHARGER

BACKGROUND OF THE INVENTION

1. Field of the Invention

The present invention relates to an electrical charger, more particularly to a compact electrical charger that facilitates storage and carrying.

2. Description of the Related Art

Referring to FIG. 1, a conventional electrical charger is shown to include a casing 11 defining a cell-holding cavity 111 therein, a transformer 12 with a pair of plug blades 121 for insertion into socket holes of a power source, and a conductive wire 13 interposed between and electrically connected to the casing 11 and the transformer 12.

The aforesaid conventional electrical charger is disadvantageous in that it is inconvenient to store and carry along.

SUMMARY OF THE INVENTION

The main object of this invention is to provide a compact electrical charger which is capable of avoiding the aforesaid drawbacks of the conventional electrical charger.

Accordingly, an electrical charger of the present invention includes a casing, a connector, a hollow rotary member, a current converting unit, a conductive wire, first and second conductive connecting members, and a power plug unit. The casing defines a receiving space. The connector is adapted to be electrically connected to an electronic device. The rotary member is mounted rotatably in the receiving space of the casing, is rotatable about a first axis. The rotary member has a wire-winding wall surrounding the first axis and confines a circuit chamber therein. The current converting unit includes a circuit board that is mounted in the circuit chamber for co-rotation with the rotary member about the first axis, and that has a bottom face formed with a pair of spaced apart electrical contacts. The conductive wire is wound around the wire-winding wall of the rotary member, and has a connecting end electrically connected to the circuit board, and a connector-coupling end connected to the connector. The first and second conductive connecting members are secured in the receiving space in the casing. Each of the first and second conductive connecting members has a board-connecting end in sliding contact with a respective one of the electrical contacts, and a bifurcated end that is opposite to the board-connecting end, that is disposed outwardly of the circuit chamber, and that defines a retaining groove. The power plug unit includes a pair of pivot pins, a pair of conductive pivot members, and a pair of plug blades. The conductive pivot members are rotatably and respectively mounted on the bifurcated ends of the first and second conductive connecting members. Each of the conductive pivot members has a grooved cylindrical portion that extends in a transverse direction relative to a respective one of the first and second conductive connecting members, and that is rotatably and detachably retained in the retaining groove of a respective one of the bifurcated ends so as to permit rotation of the conductive pivot members in the casing about a second axis which is parallel to the first axis, and a bifurcated portion projecting from the grooved cylindrical portion and defining a blade-receiving gap. The plug blades extend into the gaps of the cylindrical portions of the conductive pivot members, and are pivoted to the bifurcated portions of the conductive pivot members via the pivot pins, respectively, so as to permit rotation of the plug blades about the pivot pins relative to the conductive pivot members between a position of use, in which each of the plug blades is aligned with a respective one of the conductive pivot members along a straight line, and extends outwardly of the casing from the respective one of the conductive pivot members, and an idle position, in which each of the plug blades is angled away from the respective one of the conductive pivot members, and is embedded in the casing.

BRIEF DESCRIPTION OF THE DRAWINGS

These and other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
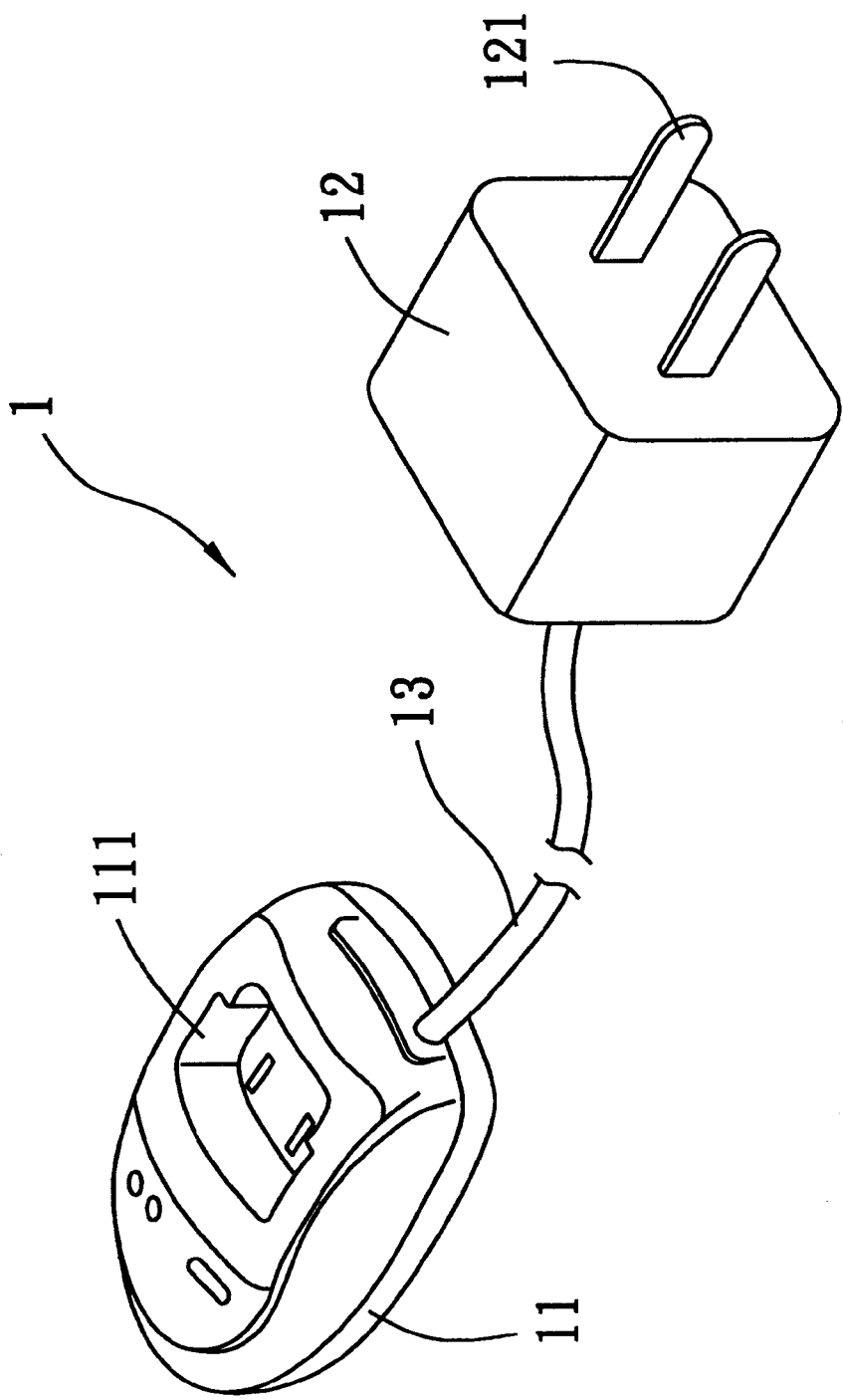
FIG. 1 is a perspective view of a conventional electrical charger.
Figure 2:
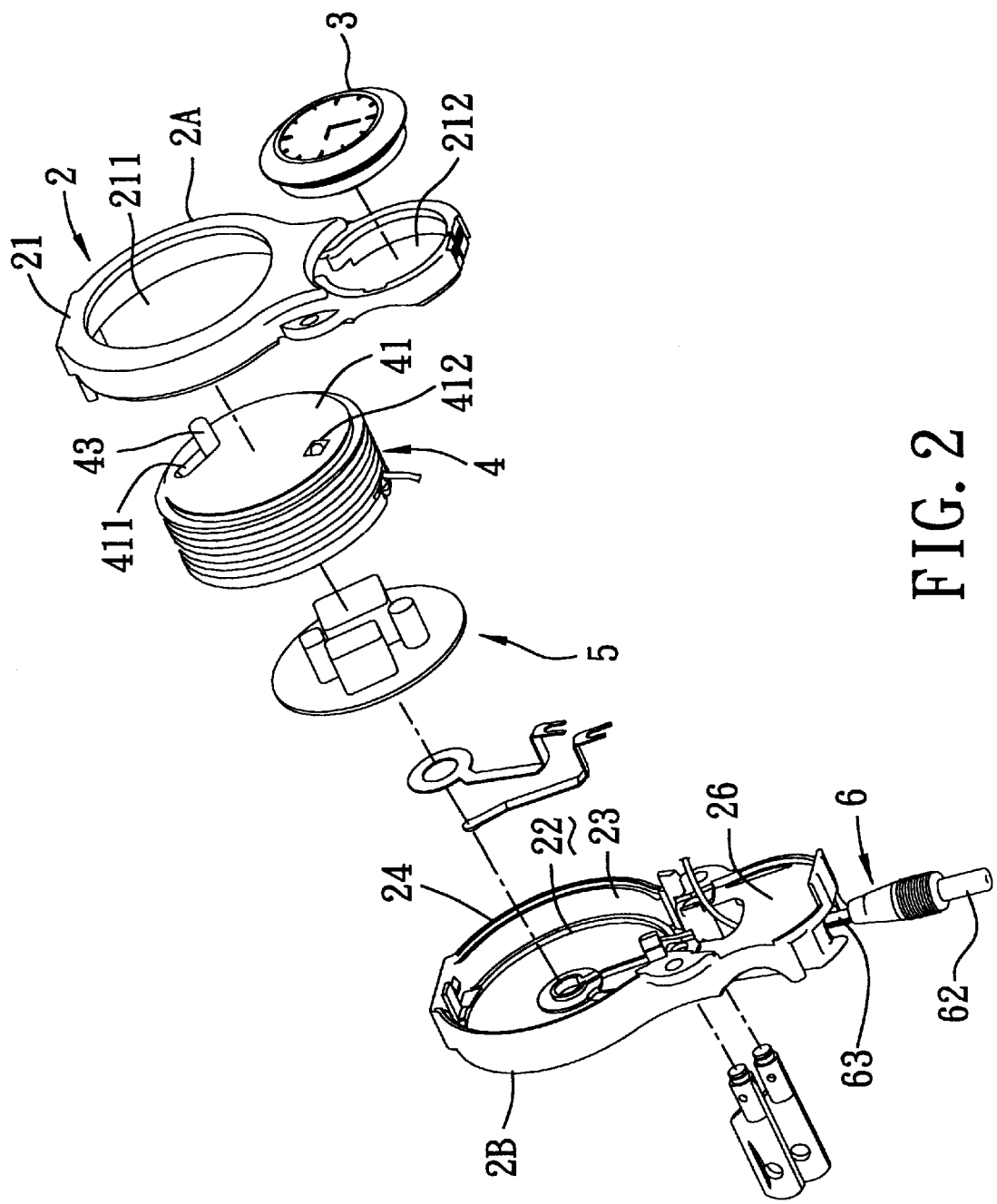
FIG. 2 is an exploded perspective view of a preferred embodiment of an electrical charger according to the present invention.
Figure 3:
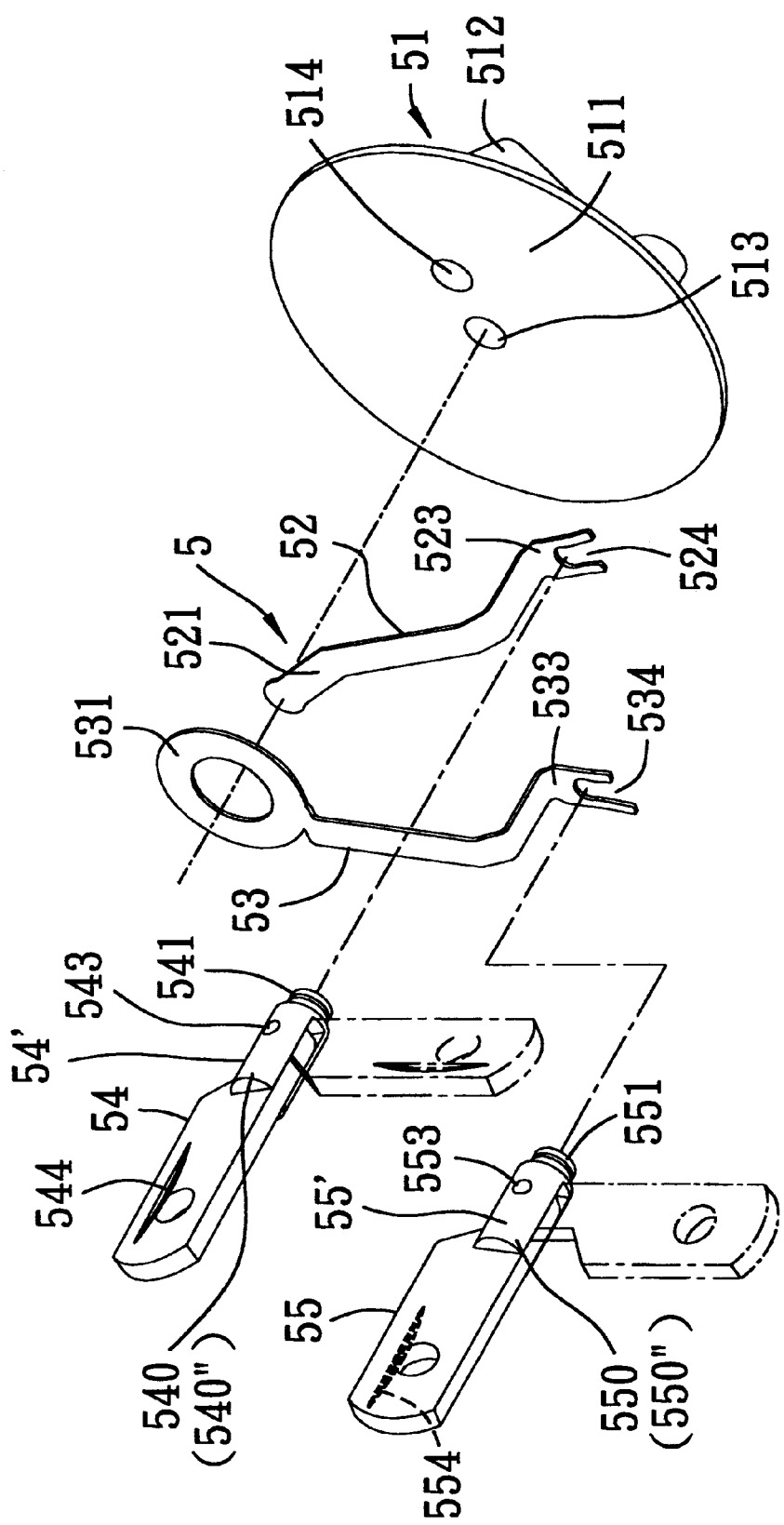
FIG. 3 is an enlarged and exploded view of a current converting unit and a power plug unit of the preferred embodiment.
Figure 4:
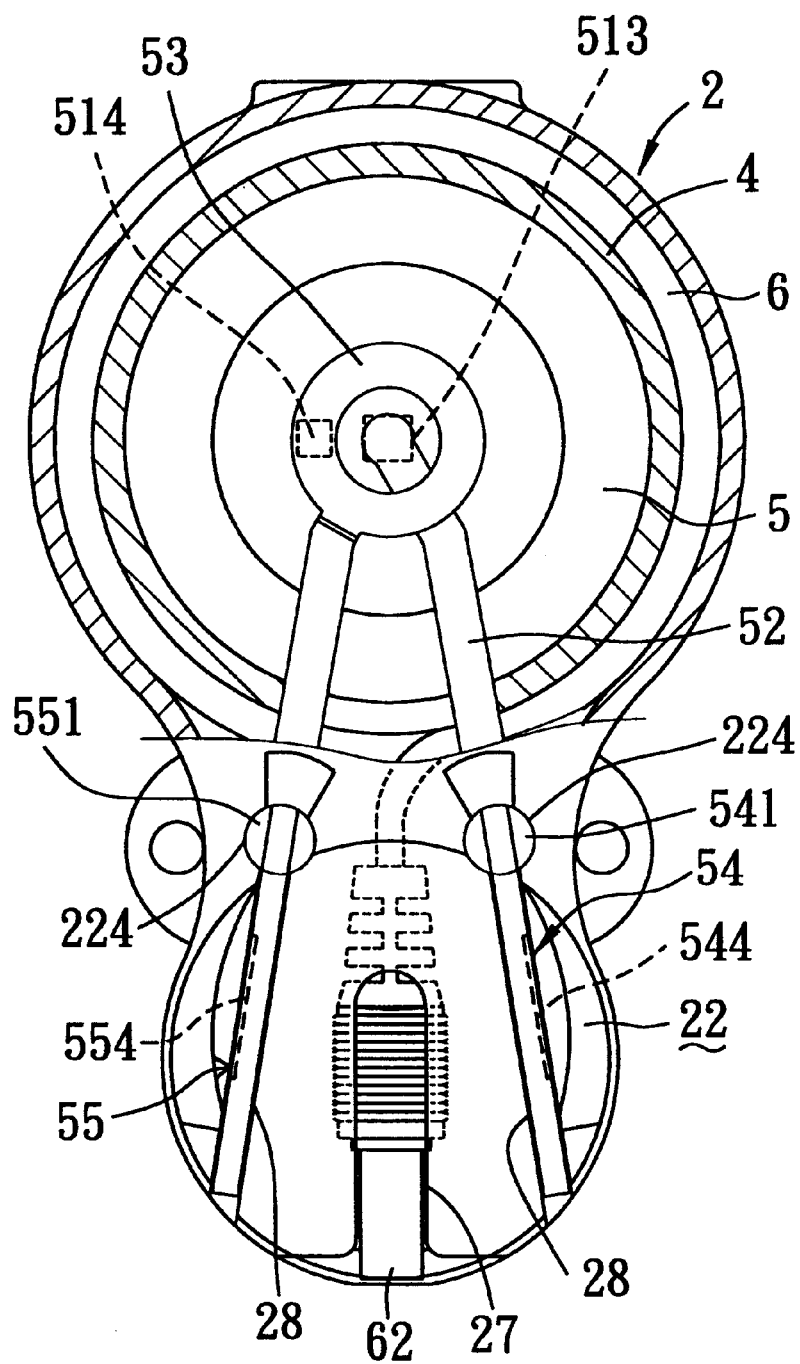
FIG. 4 is a fragmentary, sectional rear view of the preferred embodiment, illustrating the inter-relationship between two conductive connecting members and a circuit board.

Referring to FIGS. 2 to 5, the preferred embodiment of an electrical charger according to the present invention is shown to include a casing 2, a connector 62, a hollow rotary member 4, a current converting unit 5, a connective wire 6, first and second conductive connecting members 52, 53, and a power plug unit.

As illustrated, the casing 2 includes front and rear halves 2A, 2B, and a peripheral wall 23 that extends between and that cooperates with the front and rear halves 2A, 2B to define a receiving space 24 and a connector-receiving space 27 thereamong.

The connector 62 is received in and is withdrawable from the connector-receiving space 27, and is adapted to be electrically connected to an electronic device, such as a cellular phone for charging a battery unit mounted within the cellular phone.

The rotary member 4 is mounted rotatably in the receiving space 24 of the casing 2, and is rotatable about a first axis. The rotary member 4 has a wire-winding wall 44 surrounding the first axis, and confines a circuit chamber 42.

The current converting unit 5 includes a circuit board 51 that is mounted in the circuit chamber 42 for co-rotation with the rotary member 4 about the first axis, and that has a bottom face 511 formed with a pair of spaced apart electrical contacts 513, 514. A plurality of electronic components 512 are formed on the circuit board 51 and are in electrical connection with the contacts 513, 514. The electronic components 512 are capable of converting AC current into DC current. Since the feature of the present invention does not reside in the components 512, a detailed description thereof is omitted herein for the sake of brevity.

The conductive wire 6 is wound around the wire-winding wall 44 of the rotary member 4, and has a connecting end 61 electrically connected to the circuit board 51, and a connector-coupling end 63 connected to the connector 62.

The first and second conductive connecting members 52, 53 are secured in the receiving space 24 of the casing 2. Each of the first and second conductive connecting members 52, 53 has a board-connecting end 521, 531 in sliding contact with a respective one of the electrical contacts 513, 514 on the circuit board 51, and a bifurcated end 523, 533 that is opposite to the board-connecting end 521, 531, that is disposed outwardly of the circuit chamber 42, and that defines a retaining groove 524, 534.

Figure 5:
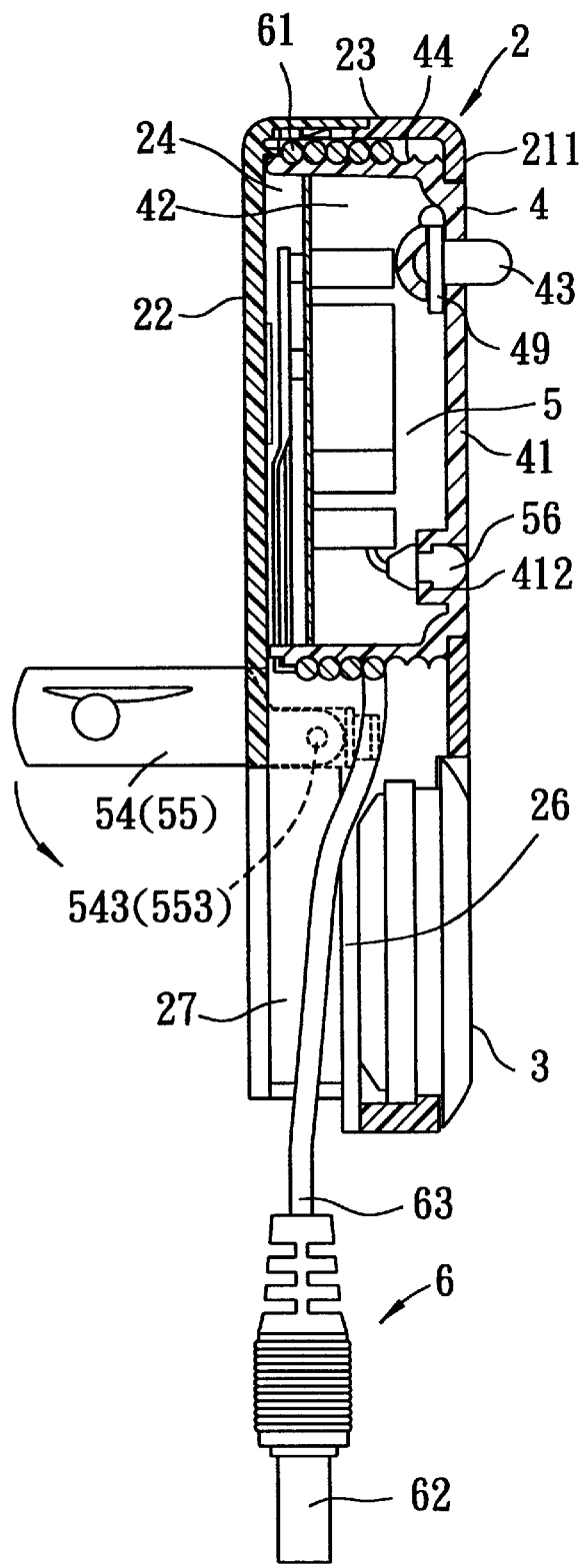
FIG. 5 is a partly sectional side view of the preferred embodiment in a position of use.
Figure 6:
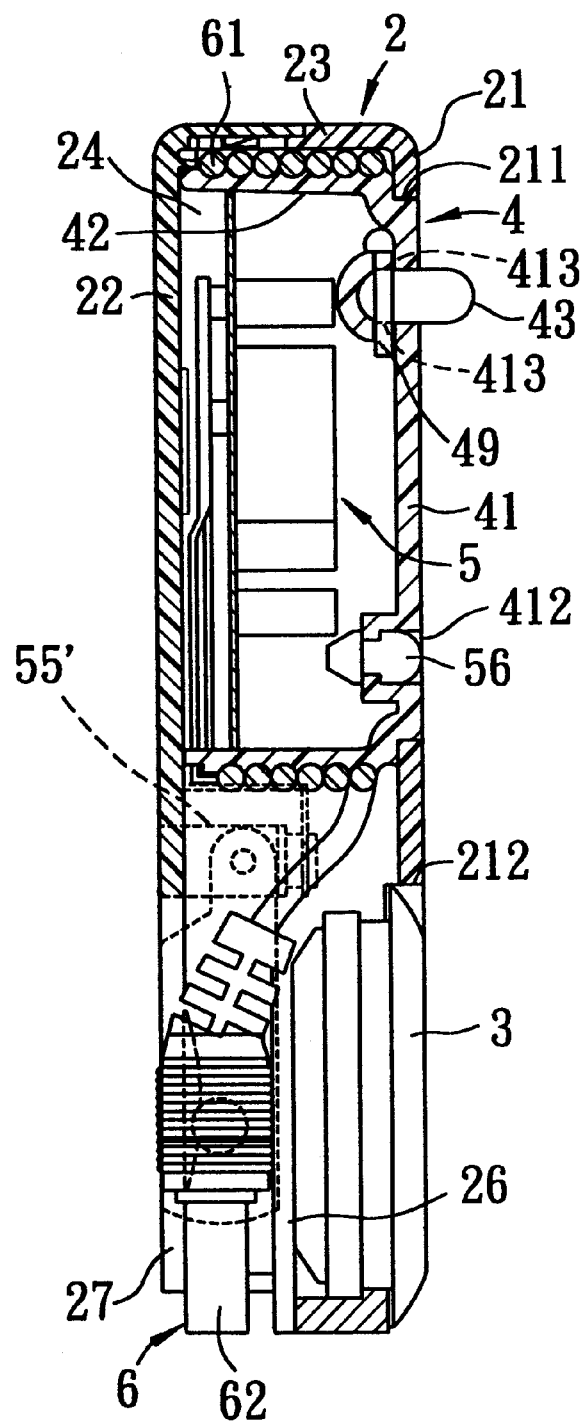
FIG. 6 is a partly sectional view of the preferred embodiment in an idle position.

The power plug unit includes a pair of pivot pins 543, 553, a pair of conductive pivot members 54', 55', and a pair of plug blades 54, 55. The conductive pivot members 54', 55' are rotatably and respectively mounted on the bifurcated ends 523, 533 of the first and second conductive connecting members 52, 53. Each of the conductive pivot members 54', 55' has a grooved cylindrical portion 541, 551 that extends in a transverse direction relative to the respective one of the first and second conductive connecting members 52, 53 and that is rotatably and detachably retained in the retaining groove 524, 534 of a respective one of the bifurcated ends 523, 533 so as to permit rotation of the conductive pivot members 54', 55' in the casing 2 about a second axis which is parallel to the first axis, and a bifurcated portion 540, 550 that projects from the grooved cylindrical portion 541, 551 and that defines a blade-receiving gap 540'', 550''. The plug blades 54, 55 extend respectively into the gaps 540'', 550'', and are pivoted to the bifurcated portions 540, 550 of the conductive pivot members 54', 55' via the pivot pins 543, 553, respectively, so as to permit rotation of the plug blades 54, 55 about the pivot pins 543, 553 relative to the conductive pivot members 54', 55' between a position of use, in which each of the plug blades 54, 55 is aligned with a respective one of the conductive pivot members 54', 55' along a straight line, and extends outwardly of the casing 2 from the respective one of the conductive pivot members 54', 55', as best shown in FIG. 5, and an idle position, in which, each of the plug blades 54, 55 is angled away from the respective one of the conductive pivot members 54', 55', and is embedded in the casing 2, as best shown in FIG. 6.

In this embodiment, the front half 2A of the casing has a front wall 21 formed a front opening 211 in spatial communication with the receiving space 24. The rotary member 4 has a front wall 41 extending from a front end of the wire-winding wall 44 to confine a front side of the circuit chamber 42 such that the front wall 41 is exposed from the casing 2 via the front opening 211. The front wall 21 of the front half 2A is further formed with a clock chamber 212 offset from the front opening 211 for receiving a clock 3 therein. The electrical charger of the present invention further includes a turning handle 43 that is mounted on the front wall 41 of the rotary member 4, and that extends outwardly of the casing 2 through the front opening 211 for turning the rotary member 4.

Figure 7:
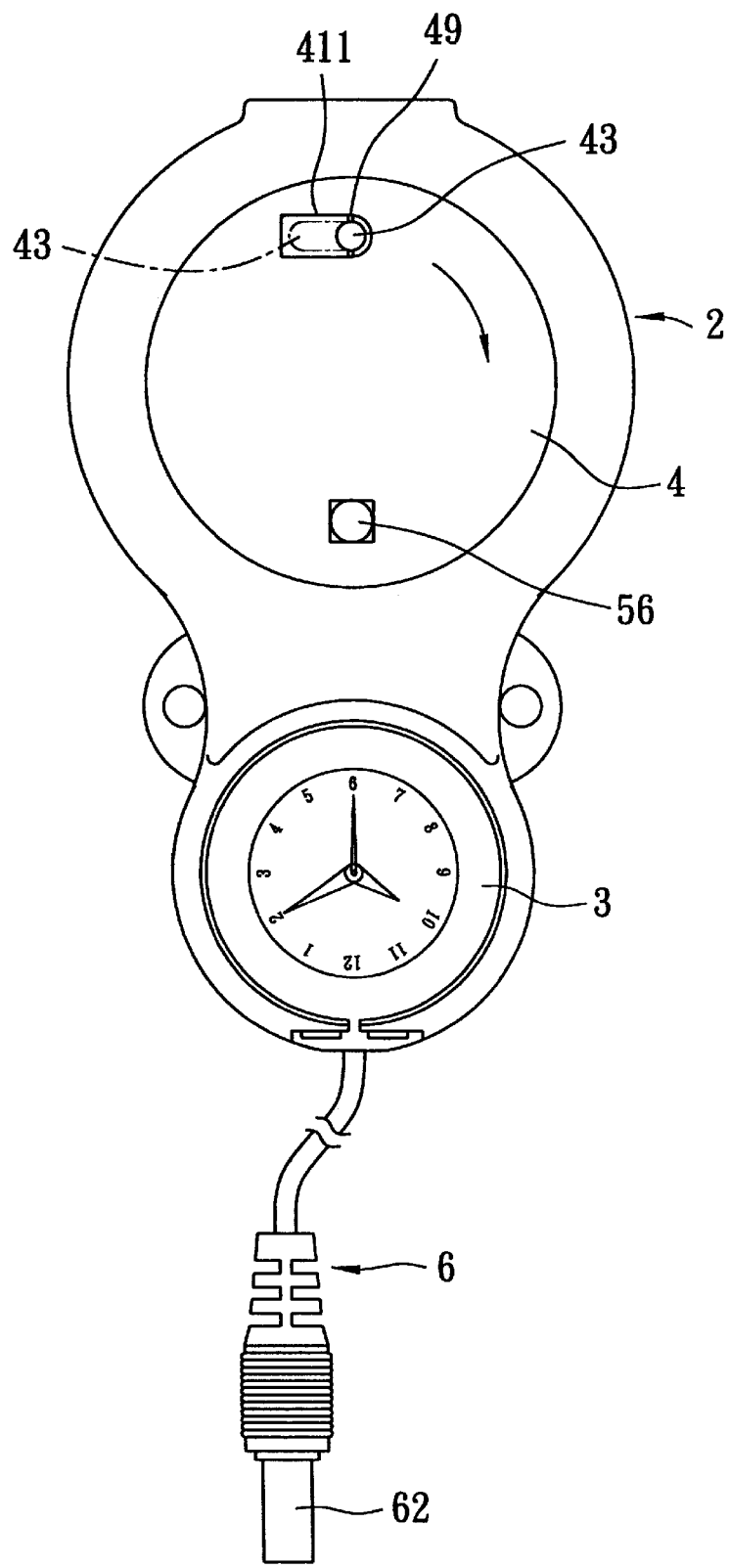
FIG. 7 is a front view of the preferred embodiment, illustrating how a handle is kept in a handle-retention slot when not in use.

Preferably, a pin 49 is mounted on the front wall 41 of the rotary member 4 within the circuit chamber 42. The front wall 41 of the rotary member 4 is formed with a handle-retention slot 411 that is confined by a slot-confining wall portion 413 (see FIG. 6) and that is in spatial communication with the circuit chamber 42 and the front opening 211. The handle 43 extends through the slot 411 and is pivoted to the pin 49 so as to permit rotation of the handle 43 about the pin 49 between a folded position, in which the handle 43 is embedded in the handle-retention slot 411 (see FIG. 7), and an unfolded position, in which, the handle 43 projects outwardly of the handle-retention slot 411 through the front opening 211 of the front wall 21, as best shown in FIGS. 5 and 6. The front wall 41 of the rotary member 4 is further formed with a bulb-mounting hole 412 to receive a light bulb 56 which is electrically connected to the circuit board 51. When the electrical charger of the present invention is in use, the light bulb 56 will be on.

The rear half 2B of the casing 2 includes a rear wall 22 formed with a pair of through holes 224 to permit extension of the conductive pivot members 54', 55' therethrough. The rear wall 22 of the rear half 2B is indented to form a pair of blade-retention slots 28 extending from and in spatial communication with the through holes 224, respectively, so as to receive the plug blades 54, 55 when the latter are disposed at the idle position. Each of the plug blades 54, 55 is further provided with a nail-groove 544, 554. The nail-grooves 544, 554 of the plug blades 54, 55 are exposed and accessible from the blade-retention slots 28 when the plug blades 54, 55 are disposed at the idle position, thereby facilitating pulling of the plug blades 54, 55 from the blade-retention slots 28. A partition 26 is disposed in a lower portion of the casing 2, confines a rear side of the clock chamber 212, and limits the extent of movement of the plug blades 54, 55 into the blade-retention slots 28.

The connector 62 can be stored inside the connector-receiving space 27 by virtue of winding of the conductive wire 6 around the wire-winding wall 44 of the rotary member 4 so as to facilitate storage of the electrical charger of the present invention.

With this invention thus explained, it is apparent that numerous modifications and variations can be made without departing from the scope and spirit of this invention. It is therefore intended that this invention be limited only as indicated by the appended claims.

I claim:

1. An electrical charger comprising:

a casing defining a receiving space;

a connector adapted to be electrically connected to an electronic device;

a hollow rotary member mounted rotatably in said receiving space in said casing and rotatable about a first axis, said rotary member having a wire-winding wall surrounding said first axis, and confining a circuit chamber;

a current converting unit including a circuit board that is mounted in said circuit chamber for co-rotation with said rotary member about said first axis, and that has a bottom face formed with a pair of spaced apart electrical contacts;

a conductive wire wound around said wire-winding wall of said rotary member, and having a connecting end electrically connected to said circuit board, and a connector-coupling end connected to said connector;

first and second conductive connecting members secured in said receiving space, each of said first and second conductive connecting members having a board-connecting end in sliding contact with a respective one of said electrical contacts, and a bifurcated end opposite to said board-connecting end disposed outwardly of said circuit chamber, and defining a retaining groove; and a power plug unit including a pair of pivot pins, a pair of conductive pivot members rotatably and respectively mounted on said bifurcated ends of said first and second conductive connecting members, each of said conductive pivot members having a grooved cylindrical portion that extends in a transverse direction relative to the respective one of said first and second conductive connecting members and that is rotatably and detachably retained in said retaining groove of a respective one of said bifurcated ends so as to permit rotation of said conductive pivot members in said casing about a second axis which is parallel to said first axis, and a bifurcated portion projecting from said grooved cylindrical portion and defining a blade-receiving gap, and a pair of plug blades extending into said gaps of said cylindrical portions of said conductive pivot members and pivoted to said bifurcated portions of said conductive pivot members via said pivot pins, respectively, so as to permit rotation of said plug blades about said pivot pins relative to said conductive pivot members between a position of use, in which each of said plug blades is aligned with a respective one of said conductive pivot members along a straight line and extends outwardly of said casing from the respective one of said conductive pivot members, and an idle position, in which, each of said plug blades is angled away from the respective one of said conductive pivot members and is embedded in said casing.

2. The electrical charger as defined in claim 1, wherein said casing has a front wall formed with a front opening in spatial communication with said receiving space, said rotary member having a front wall extending from said wire-winding wall, confining a front side of said circuit chamber, and exposing from said casing via said front opening, said electrical charger further comprising a turning handle mounted on said front wall of said rotary member and extending outwardly of said casing through said front opening for turning the rotary member.

3. The electrical charger as defined in claim 2, further comprising a pin fixed to said front wall of said rotary member within said circuit chamber, said front wall of said rotary member being formed with a handle-retention slot confined by a slot-confining wall portion and in spatial communication with said circuit chamber and said front opening, said handle extending through said slot and pivoted to said pin so as to permit rotation of said handle about said pin between a folded position, in which, said handle is embedded in said handle-retention slot, and an unfolded position, in which, said handle projects outwardly of said handle-retention slot through said front opening.

* * * * *